US009049485B1

(12) United States Patent
Nicksay et al.

(10) Patent No.: US 9,049,485 B1
(45) Date of Patent: *Jun. 2, 2015

(54) VIDEO INTERFACE

(71) Applicant: Google Inc., Mountain View, CA (US)

(72) Inventors: Alexander David Nicksay, Brooklyn, NY (US); Jennifer Bilotta, San Francisco, CA (US); Alexandra Jane Crane, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,522

(22) Filed: Apr. 30, 2014

Related U.S. Application Data

(63) Continuation of application No. 13/543,224, filed on Jul. 6, 2012, now Pat. No. 8,750,682.

(60) Provisional application No. 61/505,097, filed on Jul. 6, 2011.

(51) Int. Cl.
*H04N 21/472* (2011.01)
*H04N 21/431* (2011.01)

(52) U.S. Cl.
CPC ..... *H04N 21/47217* (2013.01); *H04N 21/4312* (2013.01)

(58) Field of Classification Search
CPC ............. H04N 7/0117; H04N 9/3188; H04N 21/234381; H04N 21/2356; H04N 21/462
See application file for complete search history.

(56) References Cited

U.S. PATENT DOCUMENTS

| | | | |
|---|---|---|---|
| 6,240,243 B1 * | 5/2001 | Chen et al. | 386/344 |
| 8,750,682 B1 * | 6/2014 | Nicksay et al. | 386/248 |
| 2006/0017844 A1 * | 1/2006 | Iwaki | 348/445 |
| 2008/0229215 A1 | 9/2008 | Baron et al. | |
| 2008/0250446 A1 * | 10/2008 | Zigmond et al. | 725/32 |
| 2008/0263583 A1 | 10/2008 | Heath | |
| 2008/0271080 A1 | 10/2008 | Gossweiler et al. | |
| 2009/0024927 A1 | 1/2009 | Schrock et al. | |
| 2010/0191689 A1 * | 7/2010 | Cortes et al. | 706/46 |
| 2011/0225614 A1 | 9/2011 | West et al. | |

OTHER PUBLICATIONS

Office Action from U.S. Appl. No. 13/543,224, dated May 9, 2013, 29 pages.
Office Action from U.S. Appl. No. 13/543,224, dated Dec. 6, 2013, 32 pages.
Notice of Allowance for U.S. Appl. No. 13/543,224, dated Mar. 12, 2014, 23 pages.

* cited by examiner

*Primary Examiner* — Tat Chio
(74) *Attorney, Agent, or Firm* — Amin, Turocy & Watson, LLP

(57) ABSTRACT

A system and method for facilitating interactions between a client browser and a video hosting server is provided. An interface can be generated that allows client devices and users to upload videos to the video hosting server. Modules in the video hosting server and/or the client device can process (transcode, compress, tag, and etc.) the videos and then store the videos to a video database. The interface can also enable searching for videos that are stored in the video database through keyword searches. The interface can also display related and/or suggested videos based on the video being displayed and/or contextual information about the user. The interface can be customizable with different views and layouts.

20 Claims, 11 Drawing Sheets

VIDEO INTERFACE

CROSS-REFERENCE TO RELATED APPLICATIONS

This application is a continuation of U.S. patent application Ser. No. 13/543,224 filed Jul. 6, 2012 and entitled "VIDEO INTERFACE," which claims the benefit of U.S. Provisional Patent Application Ser. No. 61/505,097 filed Jul. 6, 2011 and entitled "VIDEO SYSTEM", the entireties of which are incorporated herein by reference.

TECHNICAL FIELD

This disclosure relates generally to an interface for a video hosting server in a multimedia viewing environment.

BACKGROUND

Accessing video hosting servers to upload, playback, and interact with hosted multimedia has traditionally been accomplished via standalone applications on client devices and browsers displaying static websites. Standalone applications that access multimedia stored on the video hosting servers lack all of the features that can be provided. Additionally, the large number of available standalone applications are not interoperable and each of them can have steep learning curves.

Similarly, static websites can make it difficult to see related media, and the layouts can be cumbersome. The owners of different channels are also limited in how they can customize the layout of their channel.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to providing an interface for a video hosting server in a multimedia viewing environment. Disclosed herein is a system including a front end component that generates an interface that facilitates interaction between a user and a video hosting server. Also included is an ingest component that processes videos uploaded via the interface and stores the video in a video database. Also included is a video search component that locates videos in the video database based on search input received via the interface.

Also disclosed herein a method including generating an interface and facilitating interaction between a user and a video hosting server via the interface. The method also includes processing videos uploaded via the interface and storing the processed videos in a video database. The method further includes locating and playing back a selected video from the video database based on search input received via the interface.

Further disclosed herein is a non-transitory computer-readable storage medium comprising computer readable instructions, that in response to execution, cause a computer system to perform operations including generating an interface and facilitating interaction between a user and a video hosting server via an interface. The operations further include processing videos uploaded via the interface and storing the processed videos in a video database. The operations also include locating and playing back a selected video from the video database based on search input received via the interface.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Overview

Figure 1:
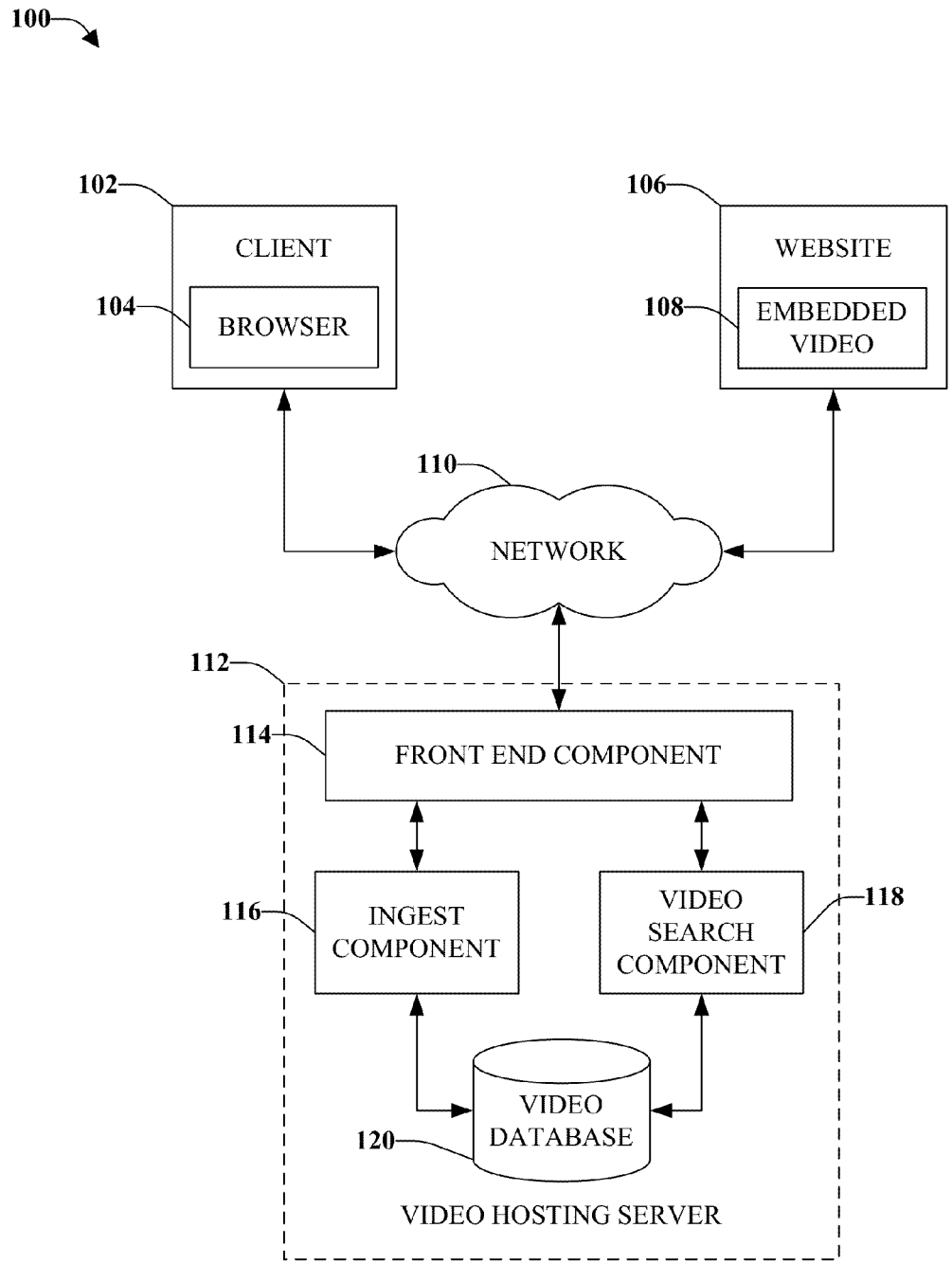
FIG. 1 is a block diagram illustrating an example, non-limiting embodiment of a system architecture in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, users can opt-in or opt-out of providing personal information, demographic information, location information, proprietary information, sensitive information, or the like in connection with data gathering aspects. Moreover, one or more implementations described herein can provide for anonymizing collected, received, or transmitted data.

As used herein, a "website" represents any computer system adapted to serve content using any network protocol, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

In one embodiment, the video hosting server is implemented as server program executing on server-class computer comprising a CPU, memory, network interface, peripheral interfaces, and other well known components. The functionality implemented by any of the elements can be provided by computer program products (e.g., as computer executable instructions) that are stored in non-transitory computer-readable storage mediums (e.g., RAM, hard disk, or optical/magnetic media).

In one embodiment, a client executing a browser or a video player application connects to the video hosting server to view media content, herein referred to as "video", "video content", or "video items" via a network such as the Internet or any combination of a LAN, a MAN, a WAN, a mobile network, a wired or wireless network, a private network, or a virtual private network. The browser or video player application allows the user of client to access videos from the video hosting server via a user interface provided by a front end interface associated with the video hosting server. Through the interface, a user can locate videos hosted on video hosting server by browsing a catalog of videos, conducting keyword searches, reviewing video lists provided by other users or the system administrator (e.g., collections of videos forming channels), or by reviewing videos associated with particular user groups (e.g., communities). The browser also enables a user to access a video indirectly, for example, via an embedded hyperlink in an email message or through a third party website.

Users can search for videos hosted on the video hosting server based on keywords, tags or other metadata. In one embodiment, search requests received by the front end interface are provided to the video search module, which searches the video database for videos that satisfy the search request. The video search module supports searching on any data field that is associated with a video stored in database. Such data fields can include, for example, a video's title, description, tags, author, category, comment, and so forth. In one embodiment, the metadata that video database associates and stores with videos include a video identifier (ID), a viral video indicator, artist, title, label, genre, time length, and optionally viewing restrictions In one embodiment, the client enables allows users to upload videos to the video hosting server through the front end interface. In one embodiment, the uploaded videos provided by users are processed by an ingest module at the video hosting server for storage in the video database. The processing can include video format conversion (transcoding), compression, metadata tagging, as well as other data processing. The ingest module processes the videos in order to standardize content for playback to users of client. In particular, transcoding the videos from one format to another enables the video hosting server to receive uploaded videos of various formats, and to provide the videos in a standardized output format to users of client. Once uploaded videos have been formatted, the ingest module stores the videos.

Referring initially to FIG. 1, a block diagram illustrating an example, non-limiting embodiment of a system architecture is shown. System 100 includes a video hosting server 112 that can be accessed by a client device 102 or a website 106 via a network 110. The client device 102 can access the video hosting server 112 using a browser application 104 and the website 106 can access the video hosting server 112 via an embedded video link 108. The video hosting server 112 can include a front end component 114, an ingest component 116, a video search component 118, and a video database 120.

The client device 102 can be any of a variety of different computing devices, some examples of which are personal computers, digital assistants, personal digital assistants, cellular phones, mobile phones, smart phones, tablet computers, and laptops. The browser 104 can include any application that allows users of the client 102 to access web pages on the World Wide Web. The browser 104 can also include a media player adapted to play one or more videos hosted on the video hosting server 112. Alternatively, the client device 102 can access videos using a standalone video player program separate from a browser. In some embodiments, a link to a video can be placed on a website 106. The link can display an embedded video 108 in the website 106.

The network 110 can be a network such as the Internet or any combination of a LAN, a MAN, a WAN, a mobile network, a wired or wireless network, a private network, or a virtual private network.

The front end component 114 in the video hosting server 112 can generate an interface that facilitates interaction between a user (e.g., via the client device 102) and the video hosting server 112. The interface can allow the user to browse for videos to search for videos using keywords to search through tags and descriptive information associated with the videos. The interface can also allow user to watch the videos and see videos that are related to the video being watched.

The interface can also be used to upload videos to the video hosting server 112 via the ingest component 116. The ingest component 116 can process the videos uploaded and store the videos in a video database 120. In some embodiments, the interface component generated by the front end component 114 can have a tool that manages the upload process. Once the video is uploaded, the ingest component 116 can perform the processing on the video. In other embodiments, the ingest component 116 can be accessed independently from the interface, for example, the ingest component 116 could be a standalone application hosted on the client device 102 to facilitate uploading videos to the video hosting server 112. In that scenario, processing of the video can take place before uploading the video to the video hosting server 112.

The video search component 118 can locate videos in the video database 120 based on search input received via the interface. The input that is received via the interface can be based on keywords, tags, and/or other metadata. In some example embodiments, the search requests received by the interface are provided to the video search component 118, which searches the video database for videos that satisfy the search request. The video search component 118 can support searching on any data field that is associated with a video stored in the video database 120. Such data fields can include a video's title, description, tags, author, category, comment, and so forth. In one embodiment, the metadata that the video database 120 associates with the videos include a video identifier, a viral video indicator, artist, title, label, genre, time length, and optional viewing restrictions.

Through the interface, a user can locate videos hosted on the video hosting server 112 by browsing a catalog of videos, conducting keyword searches, reviewing video lists provided by other users, or the system administrator (e.g., collections of videos forming channels), or by reviewing videos associated with particular user groups (e.g., communities).

In some embodiments, in a mode called "watch-while", the front end component 114 can continue to play a video that is being watched by the user, while the user navigates the interface. The video can be viewed in a player in one of the corners of the page which the channel the video is on, or other channels, can be browsed. In some embodiments, the video can be 'popped out' into a new window and continue to be watched while the interface is browsed through. The video player can be closed out without leaving the channel if desired.

Figure 2:
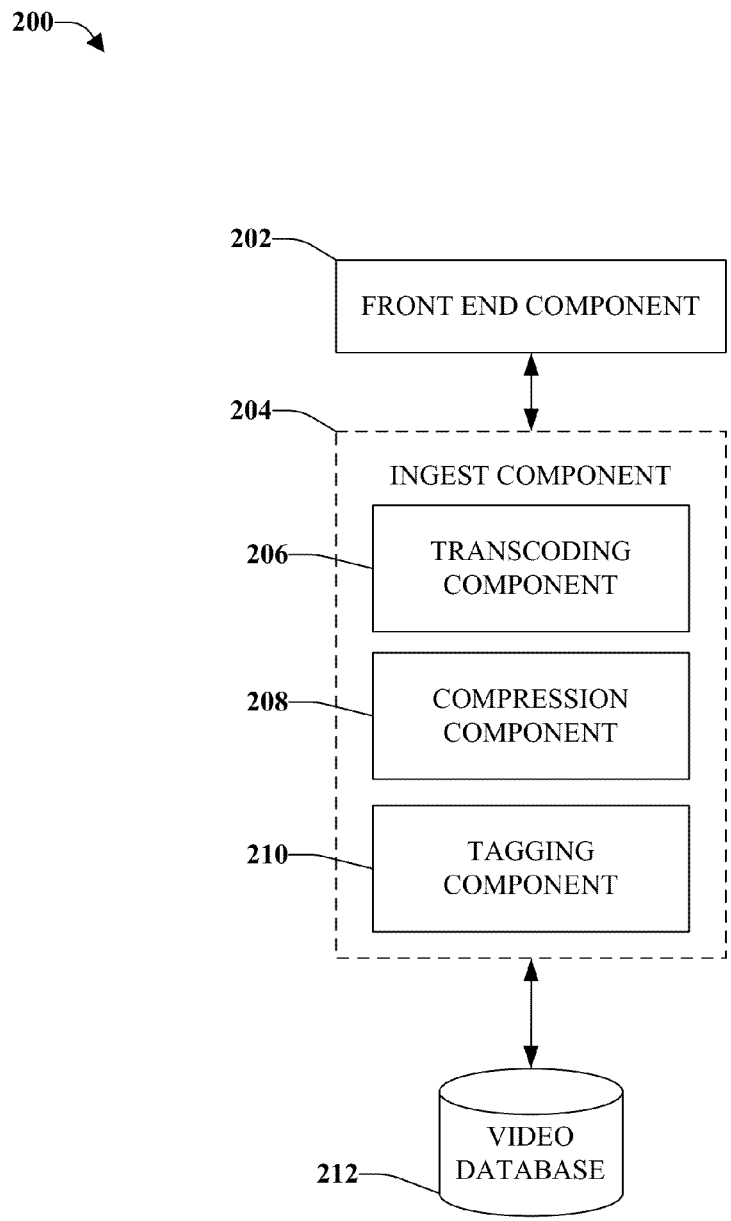
FIG. 2 is a block diagram illustrating an example, non-limiting embodiment of system for ingesting, processing, and storing uploaded videos in accordance with various aspects and implementations described herein.

Turning now to FIG. 2, a block diagram illustrating an example, non-limiting embodiment of system for ingesting, processing, and storing uploaded videos is shown. System 200 can illustrate some of the components within video hosting server 112. A front end component 202, an ingest component 204, and a video database 212 can be provided to process and store videos uploaded via the interface. Ingest component 204 can include additional components such as a transcoding component 206, a compression component 208, and a tagging component 210 for additional functionality.

The transcoding component 206 can convert a video format of the uploaded video into one or more standardized formats. The uploaded videos can be in many different formats and codecs. The transcoding component 206 can resize videos as needed, change the resolution, and change the codec, container format etc as needed so that the uploaded videos correspond to one or more standardized formats. In some embodiments, the transcoding component 206 can convert the uploaded video into several different formats. For instance, the transcoding component 206 can convert an uploaded video into several copies of the same video, with each copy having a different resolution. The copies with the different resolutions can each be saved to the video database 212 and then viewed later via the interface. In other embodiments, the transcoding component can upload a video with a single resolution, and other components can sort the video into different resolutions as it is being streamed.

The transcoding component 206 can process the videos in order to standardize content for playback to the client devices. In particular, transcoding the videos from one format to another enables the video hosting server to receive uploaded videos of various formats and to provide the videos in a standardized output format to the client. Once uploaded videos have been formatted, the ingest component 204 stores the video in the video database 212.

The compression component 208 can compress the uploaded videos. The compression component 208 can use a variety of compression algorithms, both lossy and lossless, to compress the uploaded videos. In some embodiments, an encryption component (not shown), can be included to encrypt the uploaded videos. A password, or key can be required to decrypt the videos for later playback.

The tagging component 210 can add metadata associated with the videos in response to input received via the interface. The metadata input can include video's title, description, tags, author, category, artist, title, label, genre, time length, and optional viewing restrictions among other information.

In some embodiments, the tagging component 210 can add and/or edit the metadata to the uploaded videos automatically. The tagging component 210 can determine the identity of the user uploading the video, and edit the metadata with that information. The tagging component 210 can also edit the metadata based on the upload history of the user. In some embodiments, the tagging component 210 can analyze the uploaded video, perform recognition analysis, etc, to determine the length, title, author, and genre of the video. The tagging component 210 can also automatically add tags to the videos based on the analyses performed.

It is to be appreciated that while FIG. 2 displays the ingest component 204 and its constituent components as being part of the video hosting server, the ingest component and its functionality can be included and performed on the client device in some embodiments. Therefore, the transcoding, processing, compressing, and tagging can be performed on the client device prior to uploading the video the video hosting server. This can offload processing resources from the video hosting server to the client devices which can provide a more stable environment for playing back content from the video hosting server.

Figure 3:
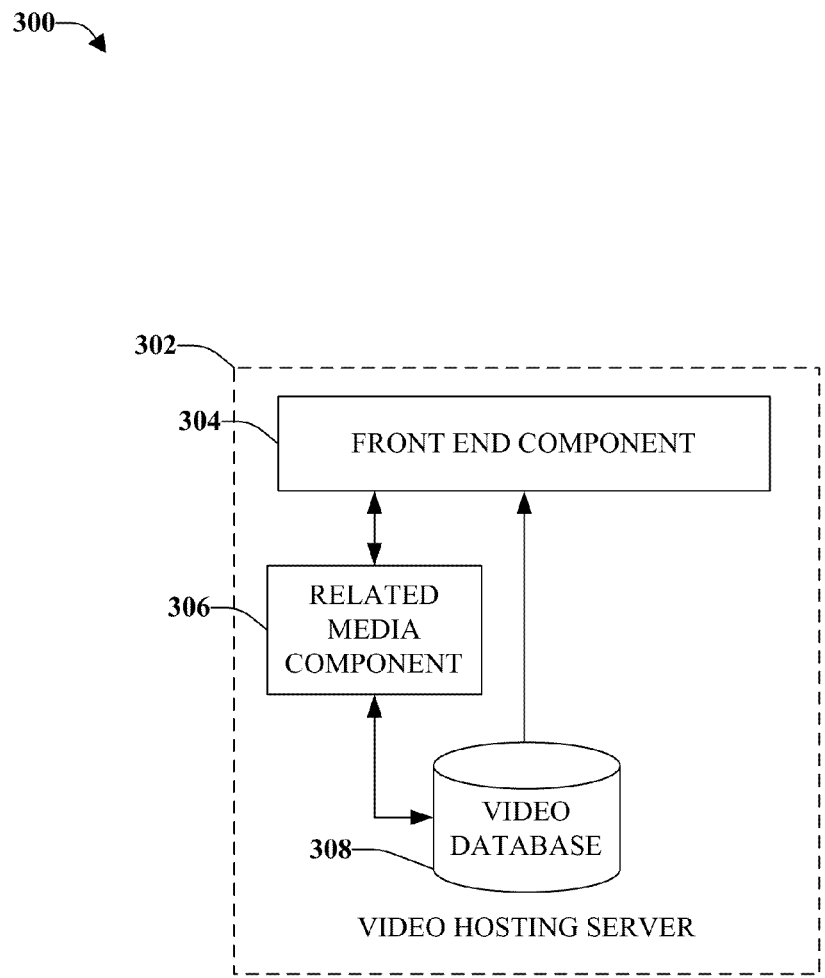
FIG. 3 is a block diagram illustrating an example, non-limiting embodiment of a system that provides links to related videos in accordance with various aspects and implementations described herein.

Turning now to FIG. 3, a block diagram illustrating an example, non-limiting embodiment of a system that provides links to related videos is shown. System 300 includes a video hosting server 302, and a front end component 304, a related media component 306, and a video database 308.

Front end component 304 can generate an interface that facilitates interaction between a user and a video hosting server. Related media component 306 can provide links to related videos in the interface based on the metadata of the video being displayed and the metadata of the related videos. Related media component 306 can search the video database 308 to find the related and/or suggested videos.

Related media component 306 can determine which videos are related by comparing the metadata associated with the videos. When a video is being played back from the video database 308 by the front end component 304, related media component 306 can analyze the metadata, tags, etc. associated with the video being displayed and search the video database 308 for videos that have matching and/or related metadata and tags. Related media component 306, upon finding related videos, can provide links to the related and suggested videos below or to the side of the video that is being watched, so that the user can clearly see other similar videos.

In some embodiments, related media component 306 can also analyze a viewing history, or preferences of the user and/or client to determine the videos that are related. Related media component 306 can also determine an age of the user, a location of the user, and other contextual information about the user to search for related videos.

Figure 4:
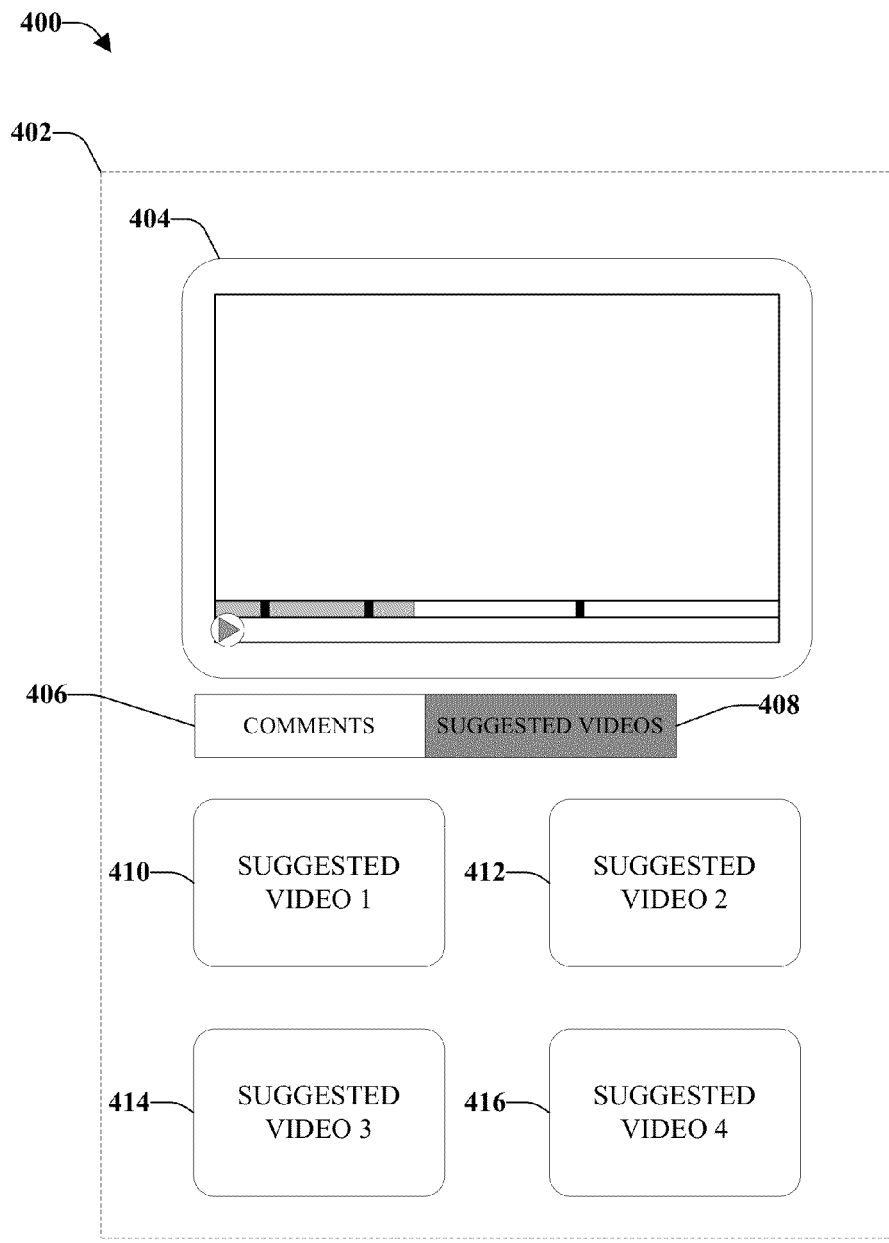
FIG. 4 is a block diagram illustrating an example, non-limiting embodiment of a interface displaying suggested videos in accordance with various aspects and implementations described herein.

Turning now to FIG. 4, a block diagram illustrating an example, non-limiting embodiment of a interface displaying suggested and related videos is shown. Example 400 shows the interface 402 generated by the front end component (e.g. 114, 202, and 304) that facilitates interaction between the user and the video hosting server (e.g. 112 and 302). A video player window 404 displays the video, and has various controls that manage playback of the video (e.g. starting and stopping the video, progress bar showing time elapsed and duration, volume controls, and etc.).

The interface 402 can also have buttons for comments and suggested videos (406 and 408 respectively). When button 406 is selected, the interface can display a list of comments associated with the video (comments not shown). The comments can be ordered in a number of ways, such as by name, by date/time, by relevance, and/or by ranking.

Selecting button 408 (as is shown in FIG. 4), can display a list of suggested videos 410, 412, 414, and 416. The suggested videos can be prepared and linked to by the related media component 306. In some embodiments, the suggested videos can be displayed below the video player 404, and in other embodiments, the suggested videos can be displayed in a sidebar beside the video player 404. Clicking on one of the suggested videos will start playing back the suggested video in the video player 404. In some embodiments, the comments and the suggested videos can be displayed simultaneously in different locations of the interface.

In some embodiments, a "side slide" mode can be activated in the interface. When the suggested videos button 408 is selected, part of or all of the interface can slide over to a page of suggested video showing the 4 videos (410, 412, 414, and 416) that were displayed on the same page as the video as well as an additional set of suggested videos linked to by the related media component 306. Clicking the suggested videos button 408 again will slide the interface back to the video player and the normal view of the interface.

Figure 5:
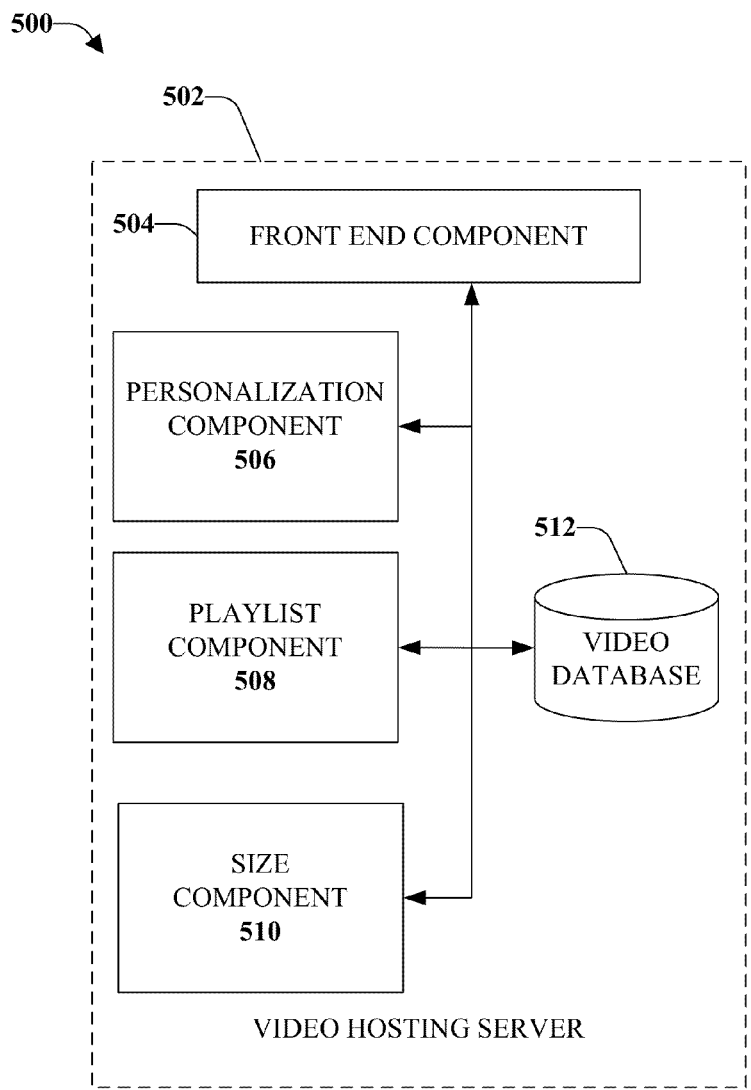
FIG. 5 is a block diagram illustrating an example, non-limiting embodiment of a system for generating and personalizing an interface in accordance with various aspects and implementations described herein.

Turning now to FIG. 5, a block diagram illustrating an example, non-limiting embodiment of a system for generating and personalizing an interface is shown. System 500 can include a video hosting server 502 that has a front end component 504, a personalization component 506, a playlist component 508, a size component 510, and a video database 512.

The front end component 504 can generate a customizable interface and the personalization component 506, the playlist component 508, and the size component 510 can be provided to facilitate the customization of the interface. The personalization component 506 can modify a layout of the interface when viewing a channel, and the modification can be based on preferences received from an owner of the channel. The playlist component 508 can display a list of selected videos in the interface in response to receiving the list of selected videos from the user via the interface. The size component 506 can alter a size of the video being played in the video player during playback.

A channel owner can set preferences for how they want a channel, or the page that their content is listed on, to appear. Such preferences can include the location of where the comments and the suggested videos appear. The preferences can also include whether or not the interface will display information about the channel and/or page and where such information appears.

In some embodiments, the personalization component 506 can also modify the layout based on the user and/or client device viewing the channel and/or page. Preferences associated with the user and/or client can be received via the front end component 504, and the personalization component 506 can modify the layout based on those preferences.

In other embodiments, the personalization component 506 can also modify the layout of the interface in real-time in response to feedback received from the user via the front end component 504. For instance, a divider between the video player and the comments, known as the "rubber band", can be dragged up or down to increase the video size and/or the scrollable comment region. The rubber band between the video player and the rest of the interface in the watch-while mode can also be adjusted by the personalization component 506 in response to feedback from the user.

In some embodiments, the personalization component 506 can provide "pinned scrolling", depending on the size and resolution of the screen. In pinned scrolling mode, the scrolling within the page will scroll only the comments and/or suggested videos area, leaving the video player displaying the video pinned to the top of the page. The personalization component 506 can activate and deactivate this feature based on the height of the browser window, display size, and etc. Whether or not the video is playing can also activate/deactivate this feature. For instance, if the video is playing, the personalization component 506 can activate pinned scrolling, and then deactivate pinned scrolling when the video is paused or stopped.

The playlist component 508 can display a list of selected videos in the interface in response to receiving the list of selected videos from the user via the interface. A user can select several videos to watch, and the playlist component 508 can display the selected videos as a playlist in the interface in response to receiving the selection. The playlist component 508 can also start playing back, or instruct the video player in the interface to start playing back a subsequent video when the preceding video is finished, in this way the videos can be played seamlessly without interruption. In some embodiments, the playlist component 508 will play the next video after receiving feedback from the user via the front end component 504.

The playlist component 508 can order the videos in the playlist based on the order that the videos were selected. Alternatively the playlist component 508 can order the videos on some other basis, such as the length of the video, ordering information in the metadata of the video and so on. For instance, if a viewer selects a sequence of videos that are designed to be watched in a certain order (e.g., a 10 part miniseries), but the videos are selected in an order other than the order they were designed to be watched, the playlist component 508 can determine the correct order based on metadata, title, and etc., and display and playback the videos in the correct order.

Size component 510 can change the size of the video player in the interface during playback of the video based on feedback received from the user via the interface and the front end component 504. A toggle, or set of buttons on the video player can be used to adjust the size of the video player that is playing the video. In some embodiments, the size can also be adjusted automatically based on metadata associated with the video. For example, metadata associated with the video can include requests or commands to resize the video after a certain time has elapsed in the video. Different videos may have different preset sizes, and when switching between videos, when the present size is changed, size component 510 can change the size of the video player and reorganize the layout of the interface accordingly.

In some embodiments, the size component 510 can also alter the resolution of the video stream in response to changing the size of the video. When the size of the video is increased, a higher resolution can maintain viewing quality. Likewise, when the size of the video is reduced, the viewing quality can be maintained while lowering bandwidth costs by reducing the resolution of video stream. In some embodiments, the automatic resolution change feature can be disabled by a link in the interface. Upon disabling the automatic resolution change, when the video size changes, the resolution will remain the same. This can speed up playback of the video as rebuffering the video stream will not be necessary.

Figure 6:
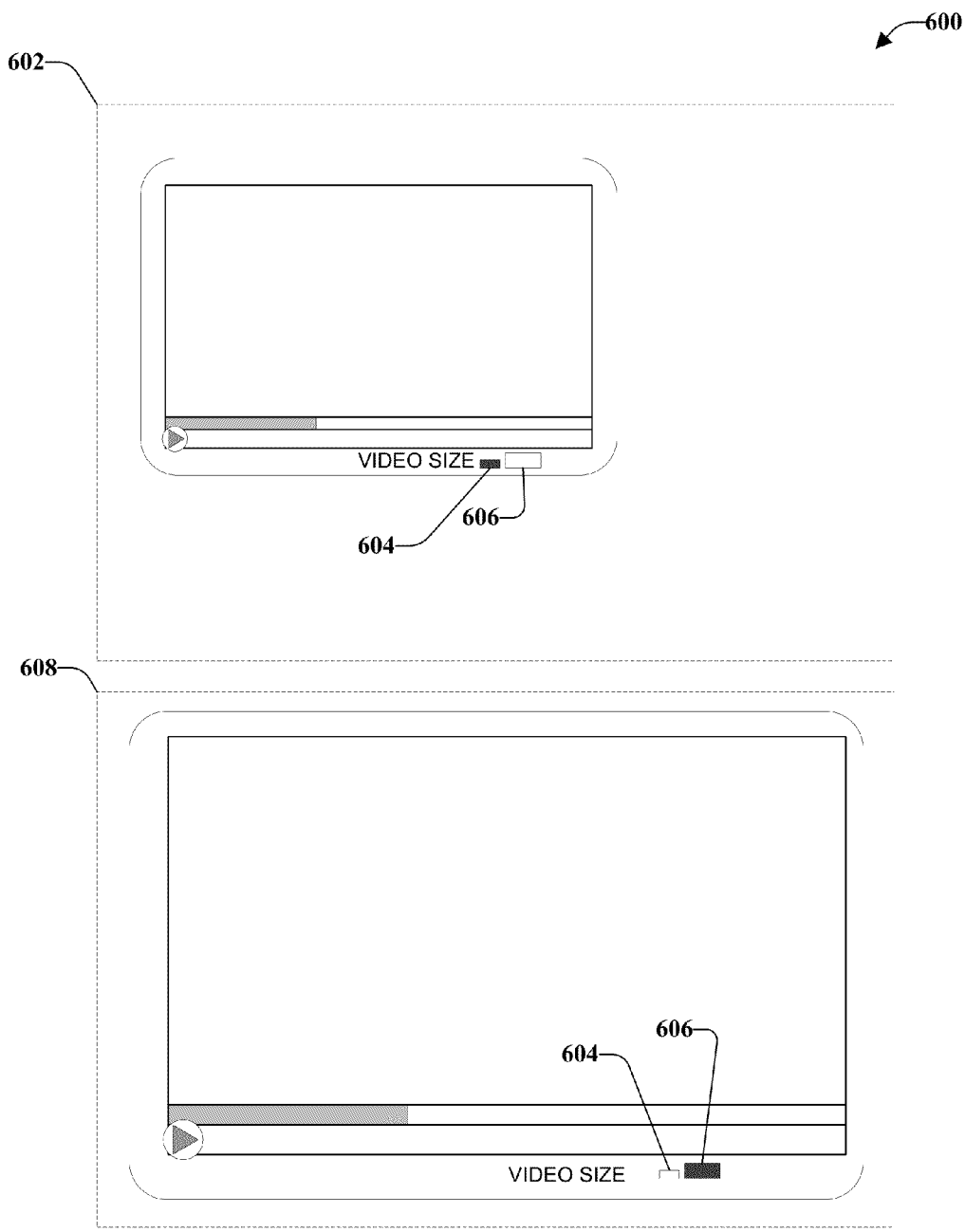
FIG. 6 is a block diagram illustrating an example, non-limiting embodiment of an interface with a display that can be resized in accordance with various aspects and implementations described herein.

Turning now to FIG. 6, is a block diagram illustrating an example, non-limiting embodiment of an interface with a display that can be resized is shown. Example 600 shows two version of an interface, 602 and 608. In 602, a video player is shown with controls (604 and 606) for adjusting the size of video. In interface 602, the button 604, for the smaller size video, is selected. In interface 608, the button 606 is selected, and the video size is larger. When the size of the video is adjusted, the video streaming resolution can be automatically adjusted (e.g., by size component 510).

It is to be appreciated that while FIG. 6 shows two sizes of videos, in other embodiments, there can be more than two different sizes of videos to select from. Additionally, in some embodiments, one of the selections can adjust the video to be the size of the display screen. The size component (e.g., 510) can determine the size of the screen on the client device via the front end component (e.g. 504) and change the size of the video to match the screen size.

Figure 7:
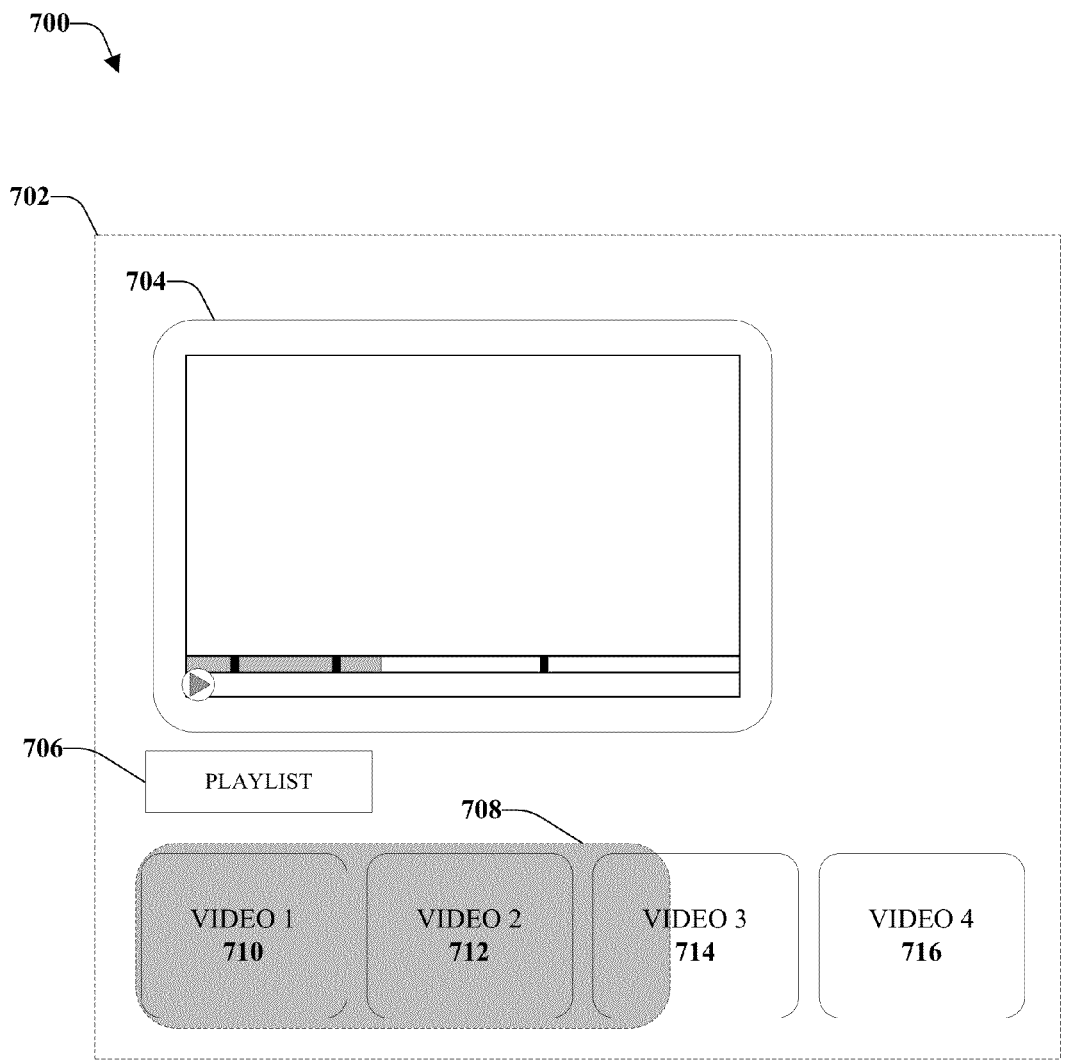
FIG. 7 is a block diagram illustrating an example, non-limiting embodiment of an interface displaying a playlist in accordance with various aspects and implementations described herein.

Turning now to FIG. 7, a block diagram illustrating an example, non-limiting embodiment of an interface displaying a playlist is shown. Example 700 can show an interface 702 with a video player 704 and a playlist tab 706 selected. The videos that form the playlist, videos 1-4 (710, 712, 714, and 716) can be displayed in a similar manner as a film strip, and a progress indicator 708 can depict the progress through the film strip.

Displaying the videos linearly as a film strip and overlaying a progress bar can show the relative progress through the playlist. In FIG. 7 for example, progress bar 708 shows that video player 704 is currently roughly a third of the way through the third video 714. As the video plays, and switches to the next video, progress bar 708 can update to show the current playlist position.

Figure 8:
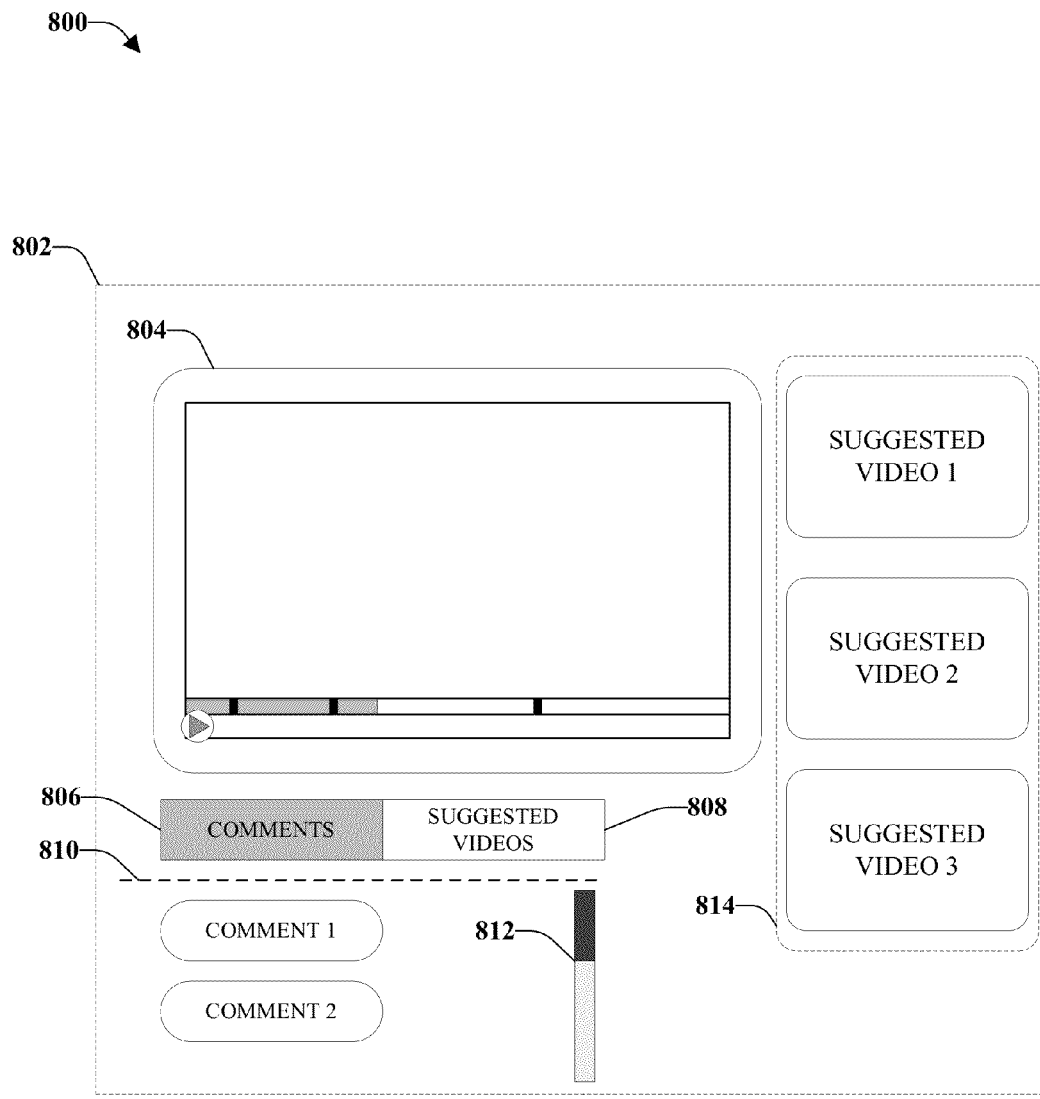
FIG. 8 is a block diagram illustrating an example, non-limiting embodiment of a customizable interface in accordance with various aspects and implementations described herein.

Turning now to FIG. 8, a block diagram illustrating an example, non-limiting embodiment of a customizable interface is shown. Example 800 includes an interface 802 with a video player 804, comments tab 806, suggested videos tab 808, comments area, and suggested videos pane 814.

Shown in FIG. 8, the comments tab 806 is activated, and it shows a series of comments. A scrollbar 812 allows the user to scroll through the comments, and the rubber band 810 can be adjusted to show a larger or smaller comment viewing area. The rubber band 810 can also be automatically adjusted based on the layout of the interface 802, and/or the size of the interface 802.

In some embodiments, if the browser height is large enough, pinned scrolling mode will activate, and scrolling within the page will scroll only the comments or suggested videos pane 814, leaving the video player 804 pinned at the top. Pinned scrolling mode can in some embodiments, override the rubber band 810.

The suggested videos pane 814 can also be independently scrolled through in some embodiments, potentially displaying more than the three videos shown in FIG. 8. Placement of the suggested videos pane 814 can also be customized, allowing the suggested videos pane 814 to be moved elsewhere within the interface. For instance, the suggested videos pane 814 can be moved to beside the comments, below the video player 804.

When suggested videos tab 808 is selected, in some embodiments, side slide mode can be activated, and the interface will increase the size of the suggested videos pane 814 to show an increased number of suggested videos. Deselecting the suggested videos tab 808 can deactivate this mode.

Figure 9:
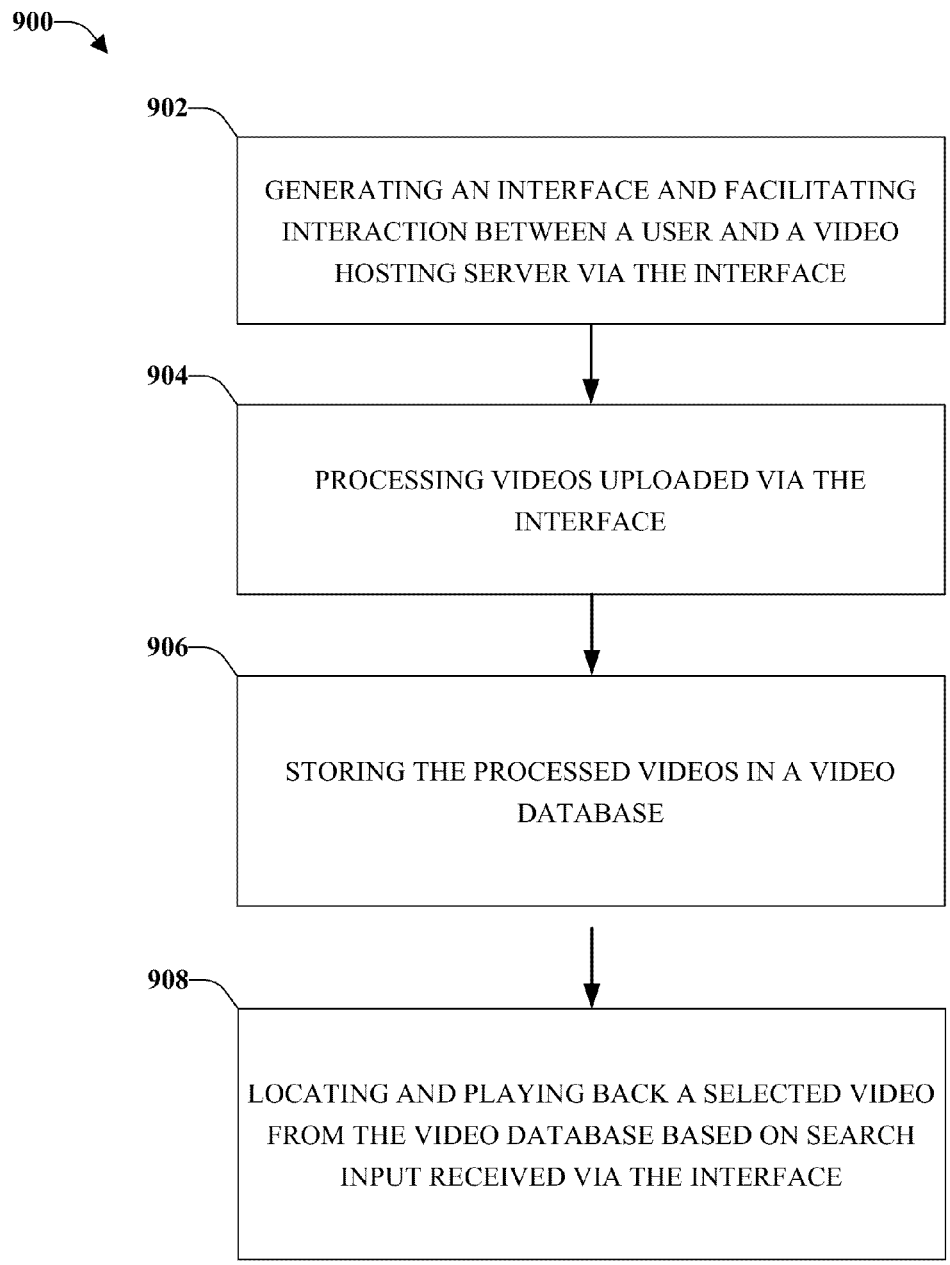
FIG. 9 illustrates a flow diagram of an example, non-limiting embodiment for providing an interactive interface, in accordance with various aspects and implementations described herein.

FIG. 9 illustrates an exemplary flow diagram 900 for a methodology for providing an interactive interface according to an aspect of the present disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the method in accordance with the disclosed subject matter. In addition, those skilled in the art will understand and appreciate that the method could alternatively be represented as a series of inter-related states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable as methods and/or in accordance with the following depicted method At 902, an interface is generated (e.g., by the front end component 114, 202, 304 and/or 504) and interaction between a user and a video hosting server is facilitated by the interface. The interface can allow the user to browse for videos to search for videos using keywords to search through tags and descriptive information associated with the videos. The interface can also allow user to watch the videos and see videos that are related to the video being watched.

The interface can also be used to upload videos to a video hosting server. At 904, the uploaded videos are processed (e.g., by ingest component 116 and/or 204). The processing can include video format conversion (transcoding), compression, metadata tagging, as well as other data processing. The videos can be processed in order to standardize content for playback to users of client. In particular, transcoding the videos from one format to another enables the video hosting server to receive uploaded videos of various formats, and to provide the videos in a standardized output format to users of client. Once uploaded videos have been formatted, at 906, the processed videos are stored in a video database (e.g., video database 120 and/or 212).

At 908, a selected video is located and played back (e.g. by video search component 118) from the video database based on search input received via the interface. The videos can be searched for based on keywords, tags, and other metadata. A video search module supports searching on any data field that is associated with a video stored in database. Such data fields can include, for example, a video's title, description, tags, author, category, comment, and so forth. In one embodiment, the metadata that video database associates and stores with videos include a video identifier (ID), a viral video indicator, artist, title, label, genre, time length, and optionally viewing restrictions.

Exemplary Computing Device

Figure 10:
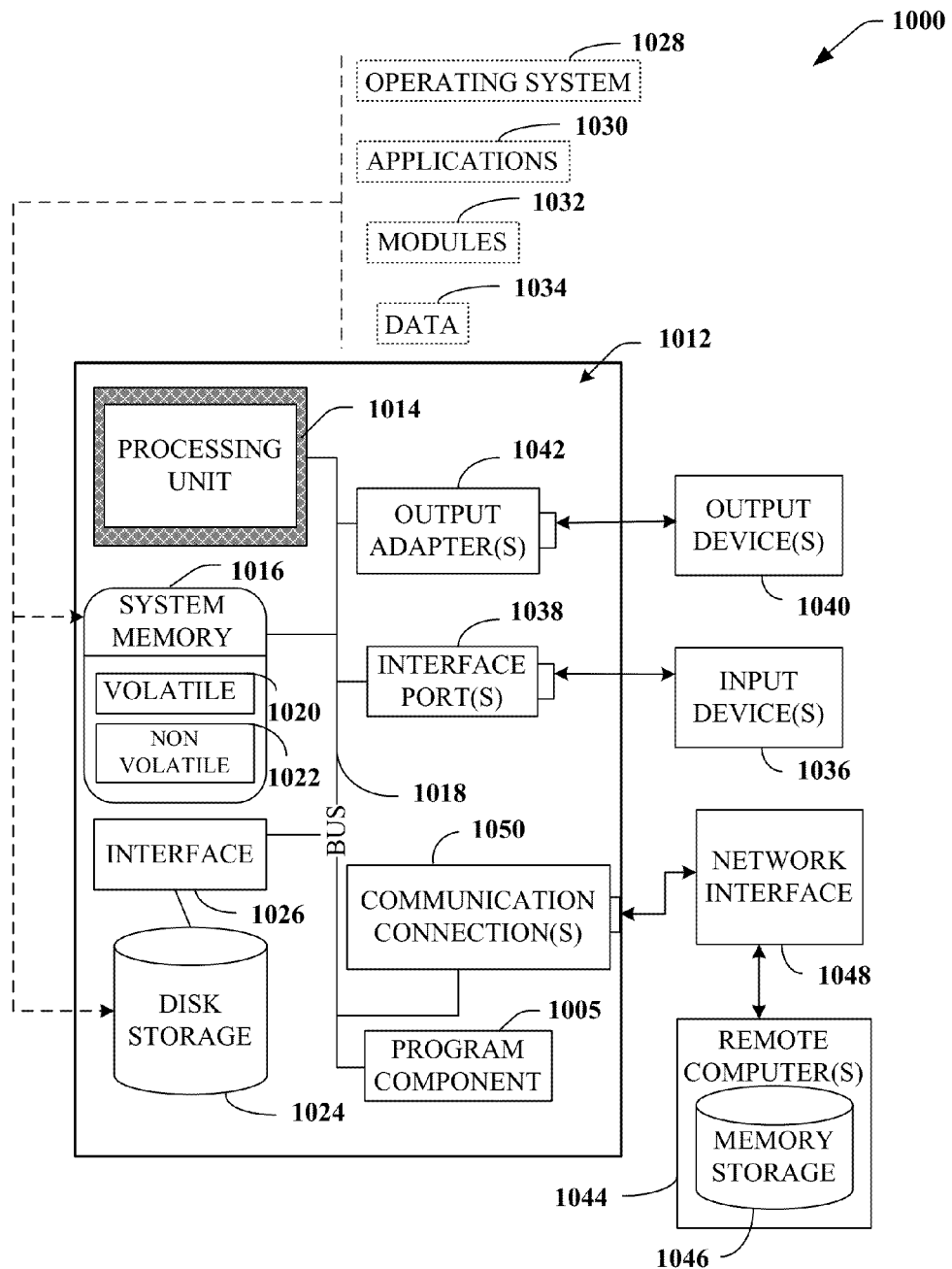
FIG. 10 is a block diagram illustrating an example computing device that is arranged in accordance with various aspects and implementations described herein.

With reference to FIG. 10, a suitable environment 1000 for implementing various aspects of this disclosure includes a computing device 1012. It is to be appreciated that the computer 1012 can be used in connection with implementing one or more of the systems or component shown and described in connection with FIGS. 1-6. The computing device 1012 includes a processing unit(s) 1014, a system memory 1016, and a system bus 1018. The system bus 1018 couples system components including, but not limited to, the system memory 1016 to the processing unit 1014. The processing unit(s) 1014 can be any of various available processors. Dual microprocessors and other multiprocessor architectures also can be employed as the processing unit(s) 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1094), and Small Computer Systems Interface (SCSI).

The system memory 1016 includes volatile memory 1020 and nonvolatile memory 1022. The basic input/output system (BIOS), containing the basic routines to transfer information between elements within the computing device 1012, such as during start-up, is stored in nonvolatile memory 1022. By way of illustration, and not limitation, nonvolatile memory (e.g., 1022) can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory (e.g., 1020) includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM. Additionally, the disclosed memory components of systems or methods herein are intended to include, without being limited to including, these and any other suitable types of memory.

Computing device 1012 can also include removable/non-removable, volatile/non-volatile computer storage media. FIG. 10 illustrates, for example, a disk storage 1024. Disk storage 1024 includes, but is not limited to, devices like a magnetic disk drive, flash drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computing device 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems.

A user enters commands or information into the computing device 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computing device 1012, and to output information from computing device 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computing device 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computing device 1012. For purposes of brevity, only a memory storage device 1046 is illustrated with remote computer(s) 1044. Remote computer(s) 1044 is logically connected to computing device 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computing device 1012, it can also be external to computing device 1012. The hardware/software necessary for connection to the network interface 1048 includes, for exemplary purposes only, internal and external technologies such as, modems including regular telephone grade modems, cable modems and DSL modems, ISDN adapters, Ethernet cards, and wireless networking cards.

In accordance with various aspects and implementations, the computing device 1012 can be used to upload, process, search for, and display streaming videos. As more fully disclosed herein, in some implementations, the computing device 1012 can include one or more processors (e.g., 1014) that can be used to process data, including processing data to perform various tasks (e.g., generating an interface, processing videos, storing the videos, and locating and playing back the videos, transcoding and compressing the videos, etc.). The computing device 1012 can include a program component 1005 that can be associated with (e.g., communicatively connected to) the one or more processors. The program component 1005 can contain, for example, a front end component, an ingest component, a video search component, a transcoding component, a compression component, a tagging component, a related media component, a playlist component, a size component, a personalization component, and/or other components, which can respectively function as more fully disclosed herein, to facilitate embodiments of the disclosure described herein.

Exemplary Networked and Distributed Environments

Figure 11:
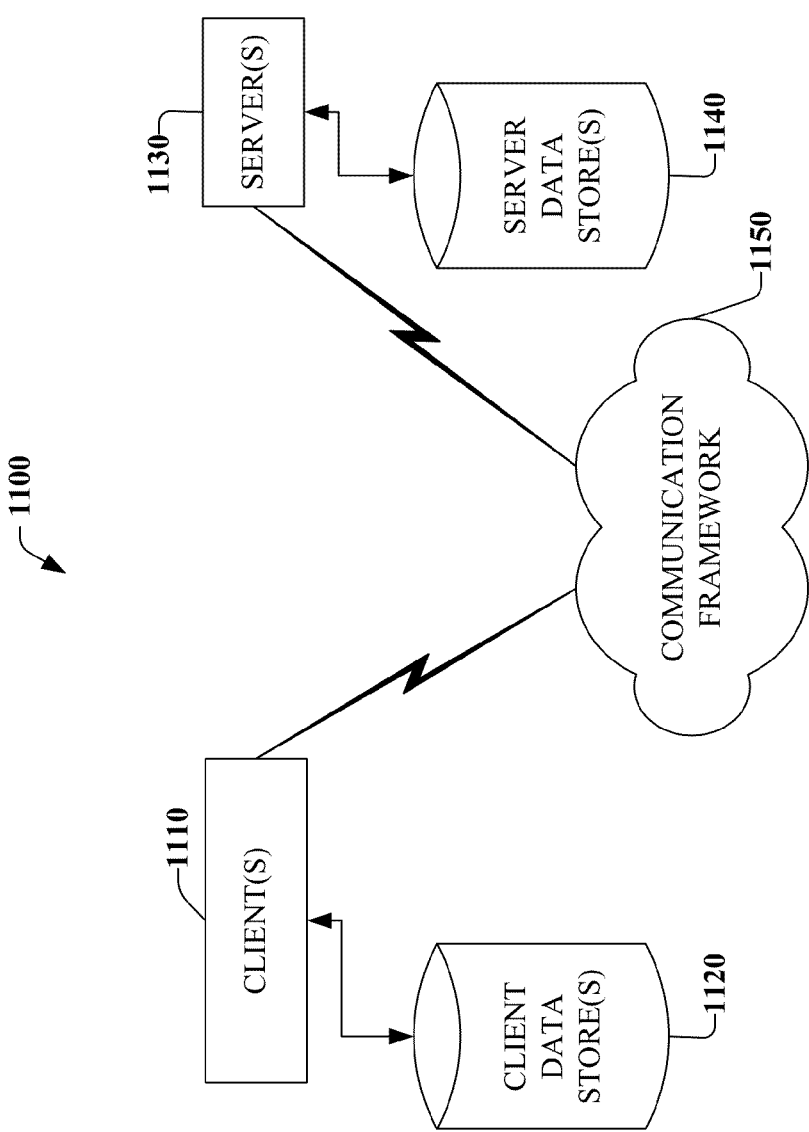
FIG. 11 is a block diagram illustrating an example networking environment in accordance with various aspects and implementations of this disclosure.

FIG. 11 is a schematic block diagram of a sample-computing environment 1100 in accordance with implementations of this disclosure. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be appreciated and understood that components, as described with regard to a particular system or method, can include the same or similar functionality as respective components (e.g., respectively named components or similarly named components) as described with regard to other systems or methods disclosed herein.

It is to be noted that aspects or features of this disclosure can be used with substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be used with legacy telecommunication technologies, e.g., GSM. In addition, mobile as well non-mobile networks (e.g., the Internet, data service network such as internet protocol television (IPTV), etc.) can be used with aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system. In the cloud computing system, computing can be delivered as a service, rather than a product. Thus, resources, software, and information can be shared between computers and servers over a network. End-users access cloud-based applications through a web browser, or other light weight desktop or mobile app while the business software and data are stored on servers at remote locations.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage, "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

What has been described above includes examples of systems and methods of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
  a memory storing computer executable components; and
  a processor configured to execute computer executable components stored in the memory comprising:
    a front end component that generates a graphical user interface for displaying a video associated with a video stream;
    a personalization component that configures the graphical user interface based on preference information and feedback received via the graphical user interface; and
    a size component that, in response to determining that an automatic resolution change setting has been enabled via the graphical user interface, selects a different video stream with a different resolution of a selected video to be delivered to the graphical user interface, in response to determining that a window size of the selected video displayed in the graphical user interface during playback has changed.

2. The system of claim 1, wherein the graphical user interface is accessed by at least one of an application on a client device and an embedded video link.

3. The system of claim 1, wherein the front end component sends search requests to a video search component that locates videos in a video database that satisfy the search request.

4. The system of claim 1, wherein the personalization component further comprises a related media component that provides links to related videos in the graphical user interface based at least in part on metadata associated with the related videos.

5. The system of claim 4, wherein the related media is selected based at least in part on information associated with a user.

6. The system of claim 1, wherein the personalization component further comprises a playlist component that displays a list of selected videos in the interface in response to receiving the list of selected videos via the graphical user interface.

7. The system of claim 1, wherein the preference information is based on profile information associated with an account.

8. The system of claim 1, wherein the preference information comprises information about a display location of comments, suggested videos, and display information about a channel associated with the video.

9. The system of claim 1, wherein the personalization component configures a layout of the graphical user interface in real time based on feedback received via the front end component.

10. The system of claim 1, wherein the front end component enables pinned scrolling where a first portion of the graphical user interface is scrollable relative to a second portion of the graphical user interface.

11. A method, comprising:
using a processor to execute computer executable instructions stored in a memory to perform the following acts:
displaying a video associated with a first video stream in a graphical user interface;
personalizing the graphical user interface based on preference information and feedback received via the graphical user interface;
determining that an automatic resolution change setting has been enabled via the graphical user interface; and
selecting a second video stream corresponding to the video to be displayed in the graphical user interface in response to determining that a window size of the first video has been adjusted in response to feedback received via the graphical user interface, wherein the second video stream has a different resolution than the first video stream.

12. The method of claim 11, further comprising:
sending search queries to a video database in response to search request entries entered via the graphical user interface.

13. The method of claim 12, further comprising:
displaying search results in the graphical user interface in response to sending the search queries.

14. The method of claim 11, further comprising:
linking to related videos in the graphical user interface based in part on a comparison of metadata associated with the related video and the video.

15. The method of claim 14, further comprising:
selecting the related videos based at least in part on profile information associated with an account.

16. The method of claim 11, further comprising:
displaying a playlist of selected videos in the interface in response to receiving the list of selected videos via the graphical user interface.

17. The method of claim 16, further comprising:
adjusting a layout of the graphical user interface in real time based on feedback received via the graphical user interface.

18. A non-transitory computer-readable storage medium comprising computer-readable instructions that, in response to execution, cause a computing system to perform operations, comprising:
displaying a video associated with a first video stream in a graphical user interface;
personalizing the graphical user interface based on preference information and feedback received via the graphical user interface;
in response to determining that an automatic resolution change setting has been enabled, selecting a second video stream corresponding to the video to be displayed in the graphical user interface in response to determining that a window size of the first video has been adjusted in response to feedback received via the graphical user interface, wherein the second video stream has a different resolution than the first video stream.

19. The non-transitory computer-readable storage medium of claim 18, wherein the operations further comprise:
configuring a layout of the graphical user interface in real time based on feedback received via the graphical user interface.

20. The non-transitory computer-readable storage medium of claim 18, wherein the operations further comprise:
scrolling a first portion of the graphical user interface relative to a second portion of the graphical user interface based on input received via the graphical user interface.

* * * * *